(12) United States Patent
Emeott et al.

(10) Patent No.: US 7,508,803 B2
(45) Date of Patent: Mar. 24, 2009

(54) TRANSPORTING MANAGEMENT TRAFFIC THROUGH A MULTI-HOP MESH NETWORK

(75) Inventors: Stephen P. Emeott, Rolling Meadows, IL (US); Charles R. Barker, Orlando, FL (US); Anthony J. Braskich, Palatine, FL (US)

(73) Assignee: Motorola, Inc., Schaumburg, IL (US)

( * ) Notice: Subject to any disclaimer, the term of this patent is extended or adjusted under 35 U.S.C. 154(b) by 225 days.

(21) Appl. No.: 11/470,969

(22) Filed: Sep. 7, 2006

(65) Prior Publication Data

US 2008/0062984 A1 Mar. 13, 2008

(51) Int. Cl.
*H04L 12/28* (2006.01)
*H04L 12/56* (2006.01)
*H04Q 7/20* (2006.01)

(52) U.S. Cl. .................. 370/338; 370/349; 370/392; 370/406

(58) Field of Classification Search .................. 370/338, 370/349, 392, 406
See application file for complete search history.

(56) References Cited

U.S. PATENT DOCUMENTS

| 5,572,528 | A * | 11/1996 | Shuen ..................... 370/402 |
|---|---|---|---|
| 6,775,258 | B1 * | 8/2004 | van Valkenburg et al. ... 370/338 |
| 6,983,167 | B2 * | 1/2006 | Adachi et al. ............... 455/522 |
| 7,016,948 | B1 * | 3/2006 | Yildiz ........................ 709/221 |
| 7,039,068 | B1 * | 5/2006 | Halasz ........................ 370/473 |
| 7,221,667 | B2 * | 5/2007 | Hori et al. ................... 370/338 |
| 7,231,530 | B1 * | 6/2007 | Miller et al. ................ 713/320 |
| 2004/0025018 | A1 * | 2/2004 | Haas et al. .................. 713/168 |
| 2004/0258092 | A1 * | 12/2004 | Sugaya ........................ 370/474 |
| 2005/0041662 | A1 * | 2/2005 | Kuo et al. .................... 370/389 |
| 2005/0249244 | A1 * | 11/2005 | McNamara et al. ......... 370/474 |
| 2006/0062391 | A1 * | 3/2006 | Lee et al. ..................... 380/270 |
| 2006/0111045 | A1 * | 5/2006 | Orlassino et al. ............ 455/41.2 |
| 2006/0256722 | A1 * | 11/2006 | Taha et al. ................... 370/235 |
| 2007/0153707 | A1 * | 7/2007 | Thubert et al. .............. 370/254 |
| 2007/0195698 | A1 * | 8/2007 | Briscoe et al. .............. 370/235 |

\* cited by examiner

*Primary Examiner*—Alpus H Hsu
(74) *Attorney, Agent, or Firm*—Randi L. Karpinia

(57) ABSTRACT

The disclosure relates to techniques and technologies for efficiently transporting management information between mesh nodes across multiple hops or "mesh links" in a multi-hop mesh network. These techniques and technologies are general purpose and provide an extensible mechanism for transporting management traffic across a mesh network. These techniques and technologies can be applied in a number of applications relating, for example, to security, routing, radio measurements, mesh node management, etc.

18 Claims, 6 Drawing Sheets

| FRAME CONTROL | DURATION/ ID | RA | TA | DA | SEQUENCE CONTROL | SA | MESH FORWARDING CONTROL | BODY | FCS |
|---|---|---|---|---|---|---|---|---|---|
| 302 | 304 | 306 | 308 | 310 | 312 | 314 | 316 | 318 | 320 |
| OCTETS: 2 | 2 | 6 | 6 | 6 | 2 | 6 | 3 | VARIABLE | 4 |

FIG. 3

TRANSPORTING MANAGEMENT TRAFFIC THROUGH A MULTI-HOP MESH NETWORK

FIELD OF THE INVENTION

The present invention relates generally to wireless communications and more particularly to multi-hop mesh networks.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. In a "multi-hop communication network" communications between nodes take place across multiple hops. As used herein, the term "multi-hop communication network" refers to any type of wireless network which employs routing protocols among nodes which are part of a network.

In such multi-hop networks, techniques have been proposed for transporting management information across multiple hops between nodes. As used herein, the term "management information" can refer to traffic related to the functions required for the management, control, operation and monitoring of a node or system. In transporting management information, the management information may need to be passed between one-hop neighbors, or may need to be forwarded between non-neighbor nodes. Current techniques for transporting management information typically carry the management information in fixed fields or information elements.

For instance, according to one proposed technique, a mesh data frame defined in the IEEE 802.11s draft standard can be re-used for transporting mesh management traffic. However, mesh data frames do not include fields that can be used by a node to distinguish between user and management traffic. Moreover, this solution adds complexity and overhead to the management traffic because the contents of the management frame are encapsulated in some new type of frame that must then be transported using a mesh data frame.

According to another technique proposed in the IEEE 802.11s draft standard, a new information element (IE) is proposed for use in an IEEE 802.11 action frame. The new IE can be used to transport or "tunnel" management traffic through a mesh network one hop at a time. However, an IEEE 802.11 action frame does not include address fields and mesh control fields needed to transport data across multiple hops (e.g., it is only designed for use between one hop neighbors). As such, according to this approach, management information must be packed into the body of the action frame and retrieved during transit. This is inefficient because a forwarding mesh node receiving management traffic encapsulated in an action frame must process the contents of the frame and reconstitute the action frame each time the traffic traverses a new hop. Moreover, IEEE 802.11 action frames do not include the fields required to implement other features, such as hop-by-hop encryption, which are needed to ensure the privacy of the mesh management traffic.

BRIEF DESCRIPTION OF THE FIGURES

The accompanying figures together with the detailed description below serve to illustrate various exemplary embodiments and to explain various principles and advantages all in accordance with the present invention.

FIG. 3 is a data structure showing a format of a mesh management frame in accordance with some embodiments of the invention;

Figure 1:
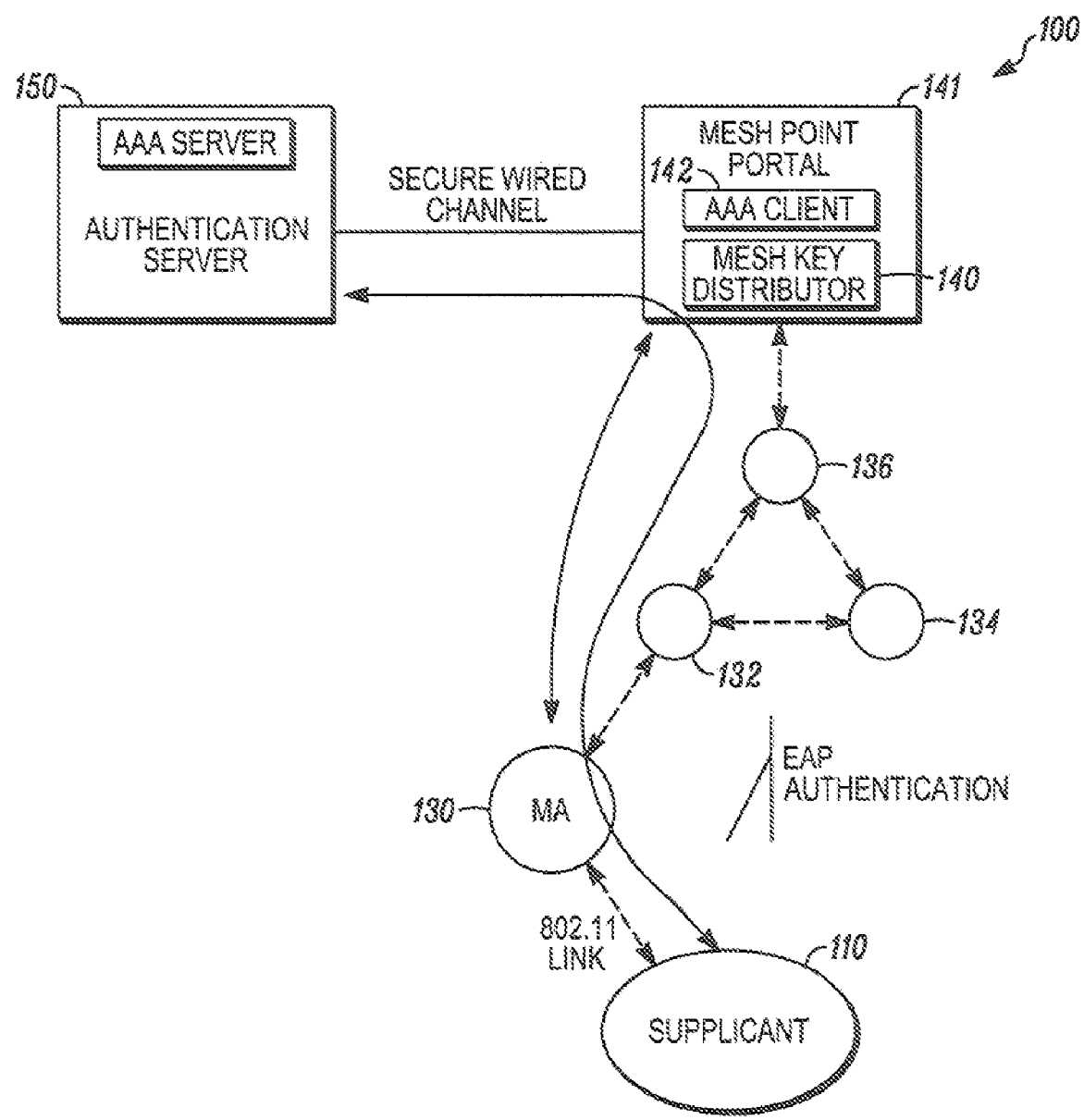
FIG. 1 is a block diagram of an exemplary communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to transporting management traffic between mesh nodes across multiple hops in a multi-hop mesh network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for transporting management traffic between mesh nodes (across multiple hops in a multi-hop mesh network) as described herein. The non-processor circuits may include, but are not limited to, a radio receiver, a radio transmitter, signal drivers, clock circuits, power source circuits, and user input devices. As such, these functions may be interpreted as steps of a method for transporting management traffic between mesh nodes across multiple hops in a multi-hop mesh network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Acronyms

The following description uses at least some of the following acronyms:
  EAPIE EAP Encapsulation information element
  EMSA Efficient Mesh Security Association
  EMSAIE EMSA Handshake information element
  KCK-KD Key confirmation key for key distribution
  KDK Key Distribution Key
  KEK-KD Key encryption key for key distribution
  MA Mesh Authenticator
  MA-ID Mesh Authenticator Identifier
  MEKIE Mesh encrypted key information element
  MKD Mesh Key Distributor
  MKD-ID Mesh Key Distributor Identifier
  MKHSIE Mesh key holder security information element
  MSD-ID Mesh Security Domain Identifier
  MSDIE Mesh Security Domain information element
  PMK Pairwise Master Key
  PMK-MA Mesh Authenticator PMK
  PMK-MKD Mesh Key Distributor PMK
  PTK-KD Pairwise transient key for key distribution Exemplary Ad Hoc Multi-Hopping Network FIG. 1 is a block diagram of an exemplary ad hoc multi-hop communication network 100. As used herein, the term "multi-hop communication network" refers to any type of wireless network which employs routing protocols among nodes which are part of a network. The network 100 comprises a plurality of nodes or "mesh points (MPs)" 110, 132, 134, 136, a mesh authenticator (MA) node 130, a mesh key distributor (MKD) 140 which can be implemented at, for example, a mesh point portal (MPP) 141, a authentication, authorization, and accounting client (AAA client) 142, which also can be implemented at a MPP 141, and an authentication server (AS) 150 which can be implemented at, for example, a authentication, authorization, and accounting server (AAA server). In the particular network configuration shown in FIG. 1, node 110 is also referred to as a "Supplicant node or Supplicant mesh node."

Because the number of nodes that that may reside within the neighborhood of a supplicant mesh point 110 can be large, and because a security association is required before a node may send a routing message to its neighbor, it is important that a mechanism be in place at each mesh authenticator 130 allowing it to communicate with a mesh key distributor 140 to obtain derived keys based upon the key material created by a supplicant mesh point 110 during its first contact and authentication with the mesh network and allowing the mesh authenticator 130 to provide the supplicant mesh point 110 with the information it requires to identify this key material and request it be used to complete an efficient security association exchange.

In the exemplary ad hoc multi-hop communication network 100 shown in FIG. 1, the infrastructure or "wired" portion of the network includes the mesh point portal (MPP) 141 which is coupled to the AS 150 by a secure wired channel. Although not shown in FIG. 1, the mesh point portal 141 can be coupled to the AS 150 via a router or other entities (not shown). In this exemplary network, the mesh key distributor (MKD) 140 and the AAA-client 142 are implemented at the mesh point portal (MPP) 141 and coupled using inter-processes messages. In this exemplary network configuration, node 136 is one hop from the MPP 141, nodes 132, 134 are two hops from the MPP 141, node 130 is three hops from the MPP 141, and node 110 is four hops from the MPP 141. In some embodiments of the present invention, the mesh point portal 141 implementing the MKD entity also implements a MA entity.

The mesh key distributor 140 communicates with a Mesh Authenticator 130 using layer 2 protocols and predefined data frames. The ability of the mesh key distributor 140 to employ layer 2 protocols for communicating with the mesh authenticator allow the security protocols required to implement efficient mesh security associations. In some embodiments of the present invention, the mesh key distributor (MKDs) 140 for a plurality of mesh authenticators 130 in a mesh security domain may be implemented in a central controller residing on a wired network and reachable to the plurality of mesh authenticators via a plurality of mesh points providing mesh portal services.

The nodes 110, 130, 132, 134, 136 typically support simultaneous operation in both infrastructureless mode and infrastructured mode and can move seamlessly between infrastructure-based networks (those including, for example, a mesh point portal 141) and client-based peer-to-peer networks which are free of any infrastructure. For example, an ad hoc multi-hopping communication network 100 can be created between a plurality of nodes 110, 130, 132, 134, 136 (each having wireless repeater and/or routing capability), and optionally a wired mesh point portal (MPP) 141. It will be appreciated by those of ordinary skill in the art that while the ad hoc network 100 in FIG. 1 is shown as operating in an infrastructured mode (e.g., including a mesh point portal (MPP) 141), the ad hoc network 100 of FIG. 1 does not require any network infrastructure to be present.

In the ad hoc multi-hopping network 100, communications to and/or from nodes 110, 130, 132, 134, 136 can "hop" through each other to reach other nodes 110, 130, 132, 134, 136 in the network. The nodes 110, 130, 132, 134, 136 can generally be wireless devices designed to allow receiving of packetized audio, video and/or data information. Some of the components in an exemplary node, such as an exemplary processor, transmitter, receiver and antenna, are described below in FIG. 2. The nodes 110, 130, 132, 134, 136 can exchange information as data packets transmitted over carrier frequencies, each of which includes one or more wireless communication channels.

In infrastructure mode, the MPP 141 is typically coupled to a wired network (not shown) and can provide one or more sources of audio, video and/or data information. The MPP 141 may be, for example, a cellular base station or other wireless access point.

Although not shown in FIG. 1, it will be appreciated by those of ordinary skill in the art that the nodes 110, 130, 132, 134, 136, can also communicate information packets with a cellular-based network (not shown) over wireless communication medium, each of which includes one or more wireless communication channels depending on the multiple access scheme utilized in the cellular-based network.

Figure 2:
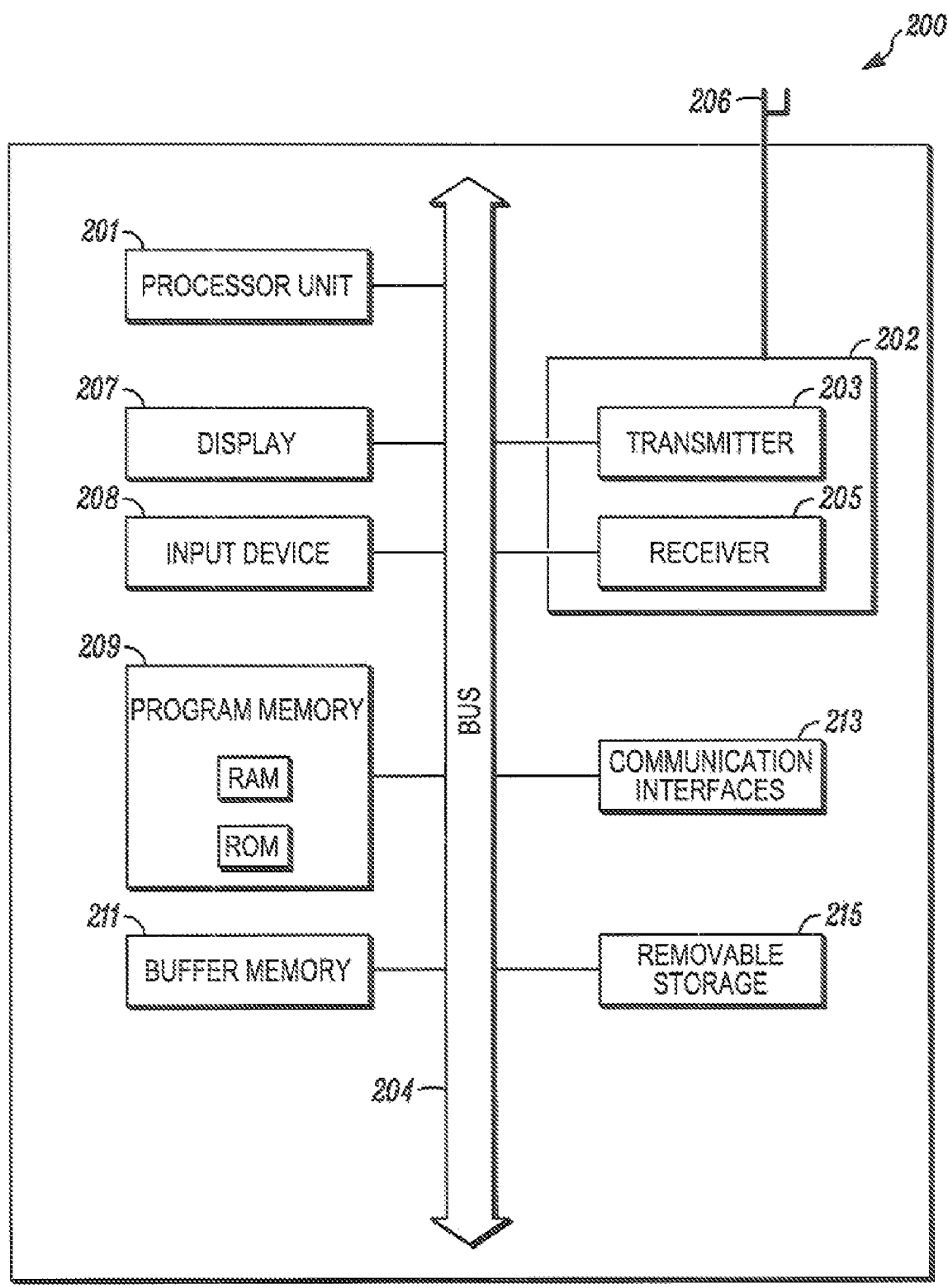
FIG. 2 is a block diagram of an exemplary node for use in the operation of some embodiments of the invention.

A description of some of the components of an exemplary node will now be provided with respect to FIG. 2.

Exemplary Node

FIG. 2 is a block diagram of an exemplary node 200. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular functions. Alternatively, the node 200 may comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax, and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of RF signals from within at least one bandwidth and optionally more bandwidths, if the communications with the proximate device are in a frequency band other than that of the network communications. The receiver circuitry 205 may optionally comprise a first receiver and a second receiver, or one receiver designed to allow receiving within two or more bandwidths. The transceiver 202 includes at least one set of transmitter circuitry 203. The at least one transmitter 203 may be designed to allow transmitting to multiple devices on multiple frequency bands. As with the receiver 205, dual transmitters 203 may optionally be employed where one transmitter is for the transmission to a proximate node or direct link establishment to WLAN's and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the node 200 is constructed to receive video information from a video source, the node 200 preferably further includes a video decoder designed to allow decoding the current Moving Picture Experts Group (MPEG) standard or some other video decoding standard. When the node 200 is further designed to allow transmitting video information, the node 200 preferably further includes a video encoder designed to allow encoding the video data into at least one of the foregoing video standards. Such a video encoder and decoder are preferably implemented as part of the processor 201.

Overview

In a multi-hop network, where communications between nodes take place across multiple hops, there is a need for improved techniques for transporting management traffic between nodes.

Techniques and technologies are provided for efficiently transporting management information between mesh nodes across multiple hops or "mesh links" in a multi-hop mesh network. These techniques and technologies are general purpose and provide an extensible mechanism for transporting management traffic across a mesh network. These techniques and technologies can be applied in a number of applications relating, for example, to security, routing, radio measurements, mesh node management, etc.

As used herein, the term "management information" can refer to traffic related to the functions required for the management, control, operation and monitoring of a node or system. Examples of management functions in a mesh network include security management, routing management, bandwidth management, performance management, system monitoring, and configuration management. Examples of management traffic include messages sent to control the behavior or operation of a node or a system or reports on the status or activities of a node.

To facilitate transport of management traffic in a mesh network, a new type of frame referred to as a "mesh action" frame is provided for transporting management traffic across one or more mesh links. The mesh action frame type distinguishes the message from a data frame, permitting the contents to be processed by the appropriate processor or internal function. The mesh action frame allows mesh nodes to distinguish between user traffic and management traffic to allow for efficient forwarding over a mesh since nodes may forward traffic without examining the contents of the frame being forwarded. Intermediate nodes forwarding a mesh action frame to its destination node can process the frame in the same manner as a mesh data frame. The destination node can use the "mesh action" frame type to facilitate processing upon receiving the frame.

In addition, techniques are provided for packing management messages into the body of this new mesh action frame type at an originating or source node, and for unpacking management messages out of the body of this new mesh action frame type at a recipient node.

In one non-limiting, exemplary implementation, the disclosed techniques and technologies can be applied in the context of devices and networks which comply with IEEE 802.11 standards such as IEEE 802.11s.

FIG. 3 is a data structure showing a format of a mesh management frame 300 in accordance with some embodiments of the invention. The mesh management frame 300 comprises a frame control field 302, a duration field 304, a receiver address field 306, a transmitter address field 308, a destination address field 310, a sequence control field 312, a source address field 312, a mesh forwarding control field 316, a body field 318 and a FCS field 320.

The frame control field 302 contains information required to identify the frame as a mesh management frame. Further, the frame control field contains a Protected Frame subfield which may indicate that the message body 318 is encrypted.

The duration field 304 contains a duration time value that is proportional to the length of the frame in bits. The duration value calculation for the mesh management frame is based on the rules that determine the data rate at which the control frames in the frame exchange sequence are transmitted.

The mesh management frame 300 comprises four address fields including the receiver address field 306, the transmitter address field 308, the destination address field 310, and the source address field 314. The receiver address field 306 is the unicast address of the node (or "mesh point") that is the immediate intended receiver of the frame or the multicast or broadcast address of the nodes (or "mesh points") that are the immediate intended receivers of the frame. The transmitter address field 308 is the address of the node (or "mesh point") that is transmitting the frame. The destination address field 310 is the destination of the Mesh Action Data Unit in the Frame Body field. The source address field 314 is the address of the node (or "mesh point") that initiated the Mesh Action Data Unit in the Frame Body field. A node (or "mesh point") uses the contents of the RA field 306 to perform address matching for receive decisions. In cases where the RA field 306 contains a group address, the SA 314 is also validated to ensure that the broadcast or multicast originated from a node (or "mesh point") with which the receiving node (or "mesh point") has an established link. A node (or "mesh point") uses the contents of the TA field 308 to direct the acknowledgment if an acknowledgment is necessary.

The sequence control field 312 value is set by a transmitting mesh point to permit the receiving mesh point to correctly process received frames by placing received frames in the order in which they were sent and to eliminate duplicate received frames.

The mesh forwarding control field 316 contains a numeric end-to-end sequence number value and a time-to-live value. The end-to-end sequence number value permits the destination node to properly order Mesh Action Data Units received from a source node. The time-to-live field mitigates the possibility of certain routing errors in a mesh network.

The body field 318 comprises Mesh Action Data Units and a security header and a security trailer (if and only if the Protected Frame subfield in the Frame Control field is set to 1). The Mesh Action Data Unit contains the Mesh Action field which will be described in more detail below with reference to FIG. 5. The Mesh Action field comprises Category and Action Value fields followed by the information elements defined for each Mesh Action.

The FCS field 320 contains a cyclic redundancy check to detect errors in the frame which may have occurred during transmission.

Figure 4:
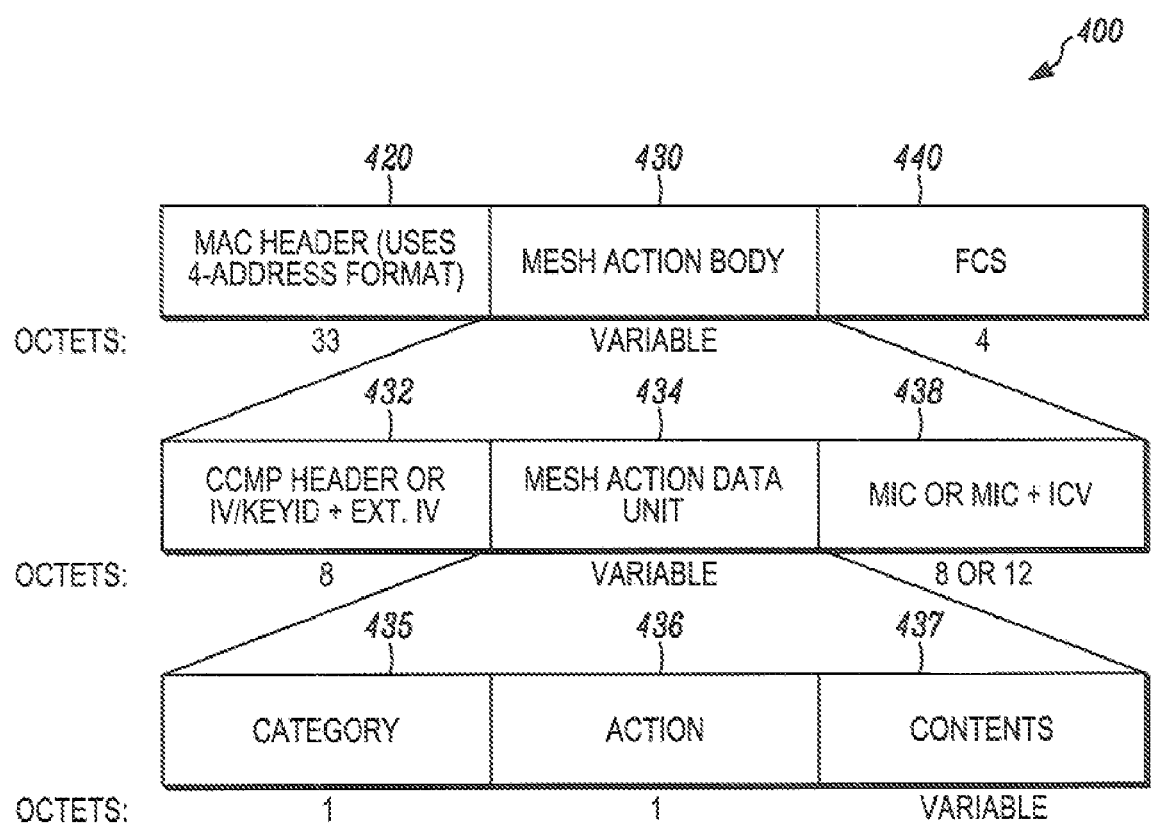
FIG. 4 is a data structure showing a format of a mesh action frame in accordance with some embodiments of the invention.

FIG. 4 is a data structure showing a format of a mesh action frame 400 in accordance with some embodiments of the invention. The mesh action frame 400 comprises a four-address MAC header 420, a mesh action body field 430 and a frame check sequence (FCS) 440. The mesh action frame 400 permits a four-address MAC Header 420 to be used with management information in the mesh action body field 430.

The four-address MAC header 420 can allow intermediate nodes to forward management traffic without examining the payload of the message. To allow forwarding of the mesh action frame 400, the four-address MAC header 420 includes address fields needed to identify an originator (or source) node (e.g., source address (SA)), a recipient node (e.g., destination address (DA)), a sender node (e.g., transmitter address (TA)) and a receiver node (e.g., receiver address (RA)). The four-address MAC header 420 and its address fields (e.g., RA 306, TA 308, DA 310 and SA 314) are described in greater detail above with reference to FIG. 3.

The FCS field 440 is used to detect errors in the frame which may have occurred during transmission. The FCS field 440 comprises a 32-bit cyclic redundancy check (CRC) that is calculated over the other fields of the frame 400 (including MAC header 420 and mesh action body field 430).

The mesh action body field 430 comprises a security field 432, a mesh action data unit 434, and a Message Integrity Check (MIC) field 438.

The security field 432 in the mesh action body field 430 of the mesh action frame 400 allows management information contents in the mesh action body field 430 to be encrypted in the same manner as data frames. The security field 432 allows management traffic to be transported across one or more mesh links while providing hop-by-hop security (e.g., privacy and integrity protection). The security field 432 can include information used by transmitting and receiving nodes to encrypt and decrypt the traffic to provide privacy. The security field 432 can include, for example, a temporal key integrity protocol (TKIP) sequence counter used in the encryption and decryption of the contents of the mesh action data unit 434, when TKIP is selected as the cipher suite for encryption. The security field 432 can alternatively include, for example, a packet number used in the encryption and decryption of the contents of the mesh action data unit 434, when counter mode with cipher-block chaining with message authentication code protocol (CCMP) is selected as the cipher suite for encryption.

The Message Integrity Check (MIC) field 438 in the mesh action body field 430 of the mesh action frame 400 allows management information contents in the mesh action body field 430 to integrity-protected in the same manner as data frames. The Message Integrity Check (MIC) field 438 can include, for example, a value computed over portions of the MAC header 420 and mesh action body field 430, with the use of a pairwise key, in order to ensure that these portions of the message have not been altered or modified during transmission. The MIC field 438 may additionally include, for example, an integrity check value (ICV) calculated using portions of the mesh action body field 430, when TKIP is selected as the cipher suite for encryption.

The mesh action data unit 434 comprises a category field 435, an action field 436, and a contents field 437. The category value, inserted in category field 435, and action value, inserted in action field 436, uniquely identify the contents field 437. The category and action values for mesh action frames are defined separately from category and action values for existing action frames. For example, an existing action frame designed for communication over a single wireless link may contain category value 0 and action value 0, to indicate particular contents, such as "Spectrum Management Measurement Request." On the other hand, for example, a mesh action frame 400 may contain category value 0 and action value 0 (in category field 435 and action field 436, respectively) to indicate different contents, such as "Efficient Mesh Security Association Mesh key holder security establishment." The mesh action data unit 434 is encrypted at each hop using the same mechanism as mesh data frames.

The category field 435 is used to categorize management traffic into different classes. At least one and possibly several different category values (e.g., category=0) can be used in the category field 435 to identify a management category (e.g. security, routing, measurement, etc.).

The action field 436 specifies individual management action values for each category field 435. In other words, for each category value, at least one and possibly several different action values can be defined for use in a particular message type or action field 436. The category field 435 allows the recipient of the mesh action frame 400 to redirect a received management frame 400 to the correct processing engine (e.g., security engine, routing engine, etc.), and the processing engine can then parse the contents field 437 of the mesh action frame 400 based upon an action specified in the message type field 436 of the mesh action frame 400.

The contents field 437 of the mesh action frame 400 comprises one or more information elements (IEs) or fixed fields corresponding to each of the different action values which can be used in the action field 436.

To better illustrate how a mesh action frame 400 could be used in a practical application, an example will now be discussed with respect to Table 1 (below). One exemplary application of the disclosed techniques and technologies relates to an efficient security mechanism that enables nodes of a mesh network to authenticate other nodes of the mesh network using derived key material obtained from a mesh key distributor. A mesh authenticator node and the mesh key distributor can transport security messages and key material between each other to support efficient security associations between member nodes. For instance, in a multi-hop network where a Supplicant node seeks to establish a security association between itself and a mesh authenticator node, security messages and key material from and to the Supplicant node are transported across multiple intermediate nodes or "hops," including the mesh authenticator node. Key material belonging to the Supplicant node and key material located at a key distributor can be transferred to the mesh authenticator node to allow a security association to be established between the mesh authenticator node and the Supplicant node.

Table 1, below, shows different combinations of values used in the category field 435 and the action field 436 according to one non-limiting, exemplary implementation.

In the particular example shown in Table 1, the category value in the category field 435 has been set to zero. Category value zero indicates an Efficient Mesh Security Association (EMSA) function. Different EMSA actions can be specified via particular action values shown in column two of Table 1. For example, action value 0 corresponds to a mesh key holder security establishment function. The mesh key holder security establishment function is used to establish a security association between two nodes to enable a mesh key hierarchy. Action value 1 corresponds to a PMK-MA delivery push function. The PMK-MA delivery push function is used to facilitate delivery of a key in the mesh key hierarchy to a mesh authenticator. Action value 2 corresponds to a PMK-MA confirmation function. The PMK-MA confirmation function is sent by a mesh authenticator node 130 to confirm key delivery. Action value 3 corresponds to a PMK-MA request function. The PMK-MA request function is sent by a mesh authenticator to request key delivery. Action value 4 corresponds to a PMK-MA delivery pull function. The PMK-MA delivery pull function is used to facilitate delivery of a key in the mesh key hierarchy to a mesh authenticator that has issued a PMK-MA request function. Action value 5 corresponds to a PMK-MA delete function. The PMK-MA delete function is sent by a mesh key distributor 140 to request a key be deleted.

Action value 6 corresponds to a mesh EAP encapsulation function. The mesh EAP encapsulation function is used to permit transport of EAP authentication messages between a mesh authenticator node 130 and a mesh key distributor 140.

TABLE 1

| Category | Action Value | Description |
|---|---|---|
| 0 | 0 | Mesh Key Holder Security Establishment: Establishes a security association between two nodes to enable a mesh key hierarchy. |
| 0 | 1 | PMK-MA Delivery Push: Facilitates delivery of a key in the mesh key hierarchy to a mesh authenticator. |
| 0 | 2 | PMK-MA Confirmation: Sent by a mesh authenticator to confirm key delivery. |
| 0 | 3 | PMK-MA Request: Sent by a mesh authenticator to request key delivery. |
| 0 | 4 | PMK-MA Delivery Pull: Facilitates delivery of a key in the mesh key hierarchy to a mesh authenticator that has sent a PMK-MA Request. |
| 0 | 5 | PMK-MA Delete: Sent by a mesh key distributor to request deletion of a key. |
| 0 | 6 | Mesh EAP encapsulation: Permits transport of EAP authentication messages between a mesh authenticator & mesh key distributor. |

Techniques will now be described for packing management messages into the body of this new type of mesh action frame at a transmitting node (e.g., originating or source node), and for unpacking management messages out of the body of this new type of mesh action frame type at a receiving node (e.g., recipient node or destination node).

Figure 5:
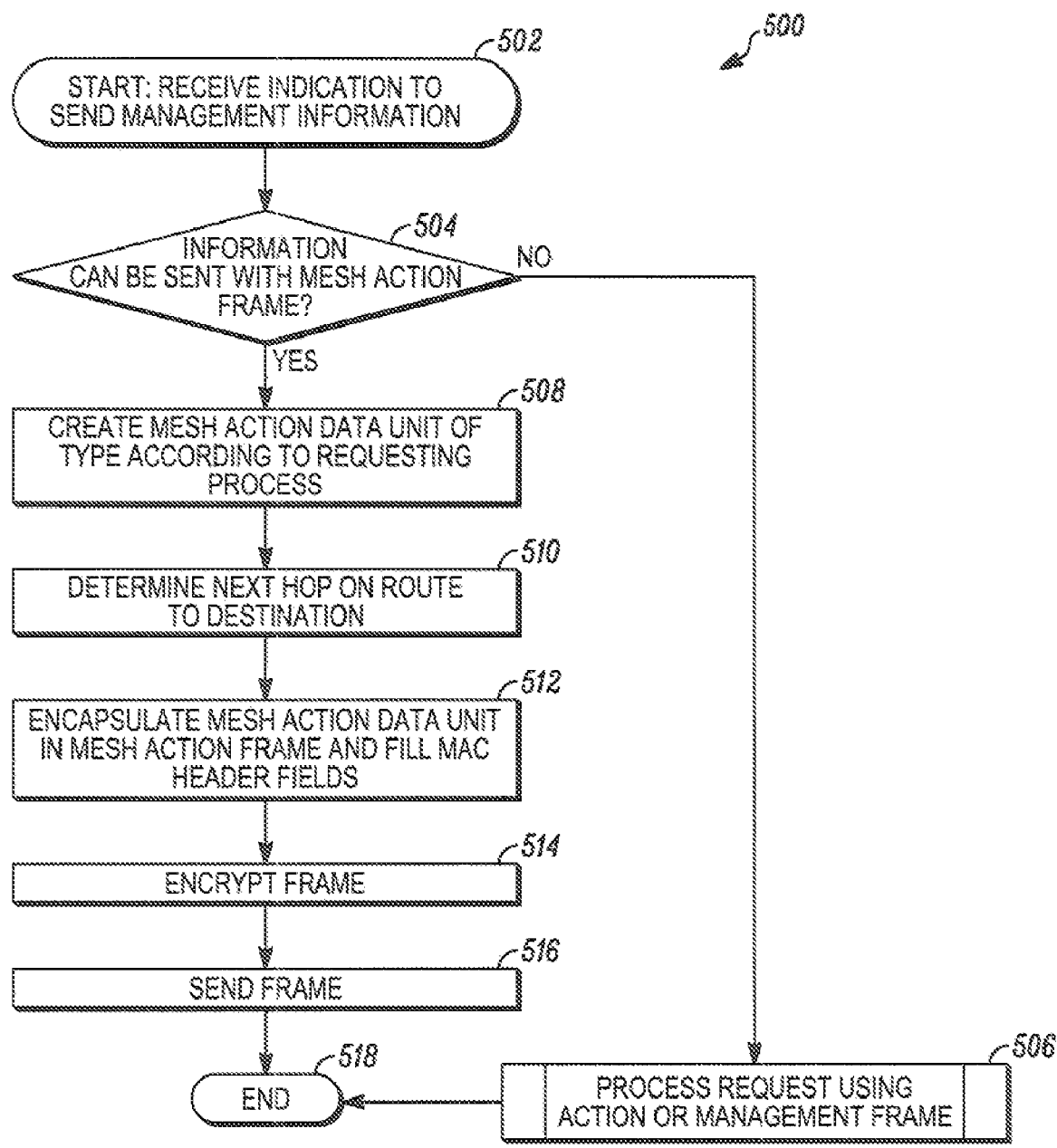
FIG. 5 is a flowchart showing an exemplary process for transmitting a mesh action frame to a receiving node in a multi-hop network in accordance with some embodiments of the invention.

FIG. 5 is a flowchart showing an exemplary process 500 which takes place in transmitting node when transmitting a mesh action frame 400 to a receiving node in a multi-hop network in accordance with some embodiments of the invention.

The process 500 starts at step 502, when a processor in the transmitting node receives an indication to send management information (e.g., a management frame). At step 504, the processor in the transmitting node determines if information can be sent using a mesh action frame 400. For example, if the management information must be sent over multiple hops in a mesh network, and category and action values are defined for a mesh action frame to correspond to the type of management information that must be sent, then the information can be sent using a mesh action frame. Alternatively, for example, if the management information must be sent to a receiver node that is one hop away from the transmitter node, or if category and action values are not defined for a mesh action frame to correspond to the type of management information that must be sent, then the information can not be sent using a mesh action frame.

If information can not be sent using a mesh action frame, then at step 506, the processor in the transmitting node processes the request using regular 802.11 action or management frame, and the process 500 ends at step 518.

If information can be sent using a mesh action frame 400, then at step 508, the processor in the transmitting node creates a mesh action data unit 434 of an appropriate type as specified by the requesting process. The mesh action data unit 434 is created, for example, by selecting a category value, based on the type of information to be sent, and inserting the value into a category field 435; by selecting an action value, based on the specific information to be sent, and inserting the value into an action field 436; and by inserting information to be sent into a contents field 437.

At step 510, the processor in the transmitting node determines the next hop address on route to the destination address.

At step 512, the processor in the transmitting node encapsulates the Mesh Action Data Unit 434 in a mesh action frame 400 and fills in the MAC header fields with appropriate addresses to identify an originator (or source) node (e.g., source address (SA)), a recipient node (e.g., destination address (DA)), a sender node (e.g., transmitter address (TA)) and a receiver node (e.g., receiver address (RA)) and other information needed in the MAC header fields.

At step 514, the transmitting node encrypts the mesh action frame 400. Encrypting the mesh action frame 400 includes, for example, constructing a security field 432 in accordance with the cipher suite selected for encryption, encrypting the contents of the mesh action data unit field 434, and inserting a MIC value in the MIC field 438. At step 516, a transmitter in the transmitting node sends the mesh action frame 400 to the next hop address on route to the destination address. At step 518, the process 500 ends.

Figure 6:
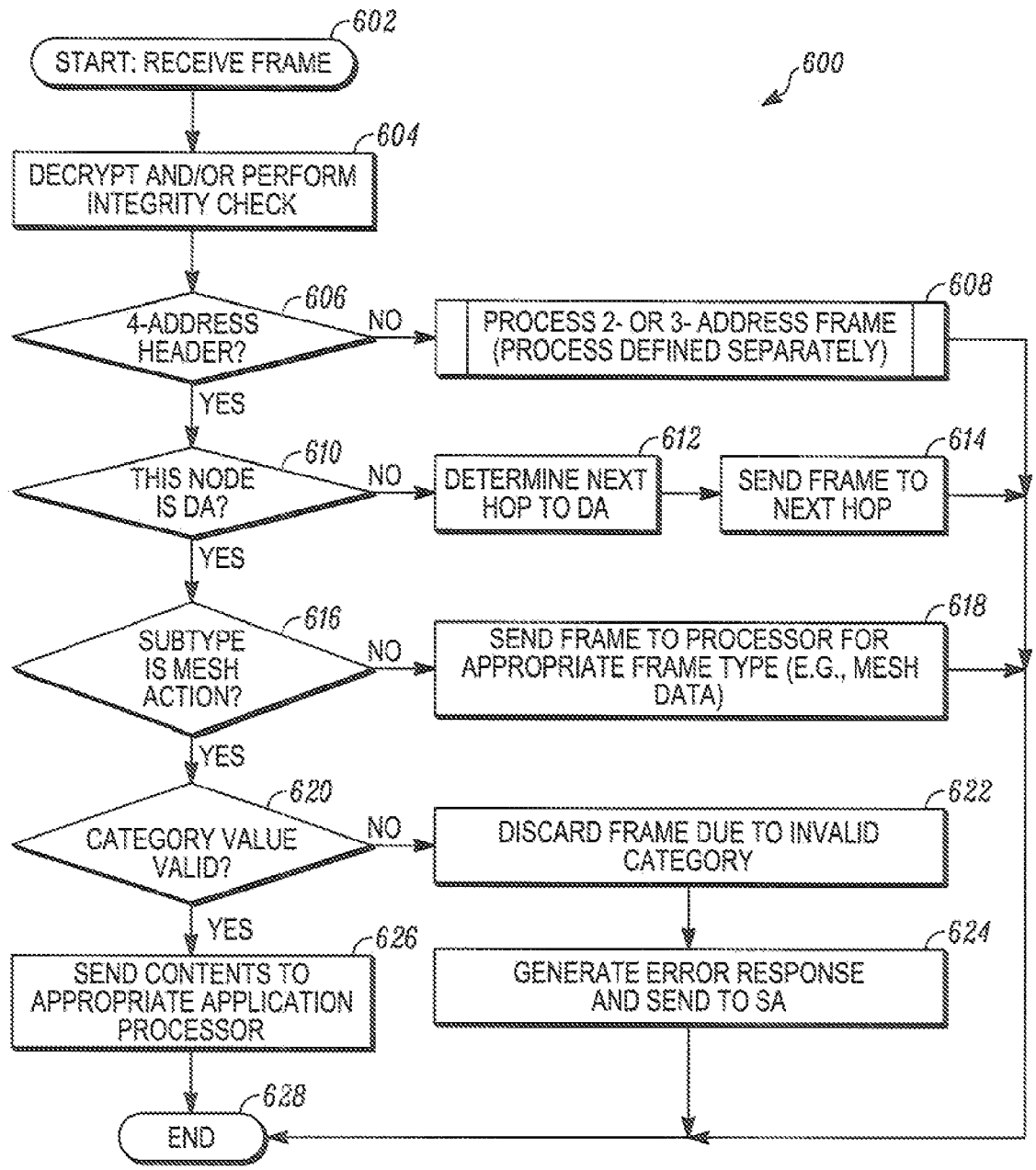
FIG. 6 is a flowchart showing an exemplary process for receiving a frame, such as a mesh action frame, from a transmitting node in a multi-hop network in accordance with some embodiments of the invention.

FIG. 6 is a flowchart showing an exemplary process 600 that takes place at a receiving node upon receiving a frame (e.g., a mesh action frame 400) from a transmitting node in a multi-hop network in accordance with some embodiments of the invention.

The process 600 starts at step 602, when a receiver in the receiving node receives a frame from the transmitting node.

At step 604, a processor in the receiving node can decrypt the frame and/or perform an integrity check on the management frame. The processor may first determine if the frame received must be decrypted or contains an integrity check value to be verified. Certain received frames, for example, may not require decryption or an integrity check to be performed. If required, the processor may decrypt or perform an integrity check, or both. Although the implementation shown in FIG. 6 shows step 604 occurring before step 606, it will be appreciated that the order of the steps shown in FIG. 6 is not limiting, and that step 604, for example, can be performed, for instance, after step 606.

At step 606, the processor in the receiving node determines if the MAC header on the management frame is a four-address MAC header.

If the header on the management frame is not a four-address MAC header (e.g., is a two-address MAC header or a three-address MAC header), then at step 608, the processor in the receiving node processes the management frame in a manner appropriate to a frame containing two- or three-address MAC header. For example, if the frame received is a two-address MAC header frame, further processing may determine that the frame is a conventional action frame, and the contents of the frame may be processed in a manner appropriate to a conventional action frame. At step 628, the process 600 ends.

If the MAC header on the received frame is a four-address MAC header (e.g., a MAC header 420), then at step 610, the processor in the receiving node determines whether the receiving node is the destination node for the received frame by checking the destination address specified in the MAC header of the received frame.

If the receiving node is not the destination node for the received frame, then at step 612, the processor in the receiving node determines the next hop node to the destination address, and at step 614, a transmitter in the receiver node sends the received frame to the next hop node. At step 628, the process 600 ends.

If the receiving node is the destination node for the received frame, then at step 616, the processor in the receiving node determines whether the subtype indicated in the received frame is a mesh action subtype.

If the subtype indicated in the received frame is not the mesh action subtype, then at step 618, the processor in the receiving node sends the received frame to a processor for the appropriate frame subtype (e.g., mesh data). An example of frame subtype can include, for example, a mesh data subtype, to indicate that the contents of the frame are data to be processed by the mesh data processor. At step 628, the process 600 ends.

If the subtype indicated in the received frame is the mesh action subtype, then it is determined that the received frame is a management frame, and specifically a mesh action frame, and at step 620, the processor in the receiving node determines whether the category indicated in the mesh action frame 400 is a valid category value (e.g., category zero is the only valid category in one non-limiting example).

If the category indicated in the received mesh action frame 400 is not a valid category value, then at step 622, the processor in the receiving node discards the frame as belonging to an "invalid" category, and at step 624 generates an error response which is sent to the source address of the mesh action frame, as indicated by the source address (SA) information included in the MAC header 420 of the mesh action frame 400. At step 628, the process 600 ends.

If the category indicated in the mesh action frame 400 is a valid category value, then at step 626, the processor in the receiving node sends the contents of the mesh action frame 400 to an appropriate application processor or other internal function, selected in accordance with the category value.

For example, when the contents of the mesh action frame 400 relate to functions such as key delivery or authentication message transport in a security management application, the mesh action frame 400 can be sent to a security application processor. When the contents of the mesh action frame 400 relate to functions such as route establishment, route discovery, or route error indication in a routing management application, the mesh action frame 400 can be sent to a routing processor. When the contents of the mesh action frame 400 relate to functions such as bandwidth requests, bandwidth responses, or bandwidth revocations in a bandwidth management application, the mesh action frame 400 can be sent to an bandwidth management processor. When the contents of the mesh action frame 400 relate to functions such as route health reports, route utilization, or network congestion reports in a system monitoring application, the mesh action frame 400 can be sent to an appropriate system monitoring processor. When the contents of the mesh action frame 400 relate to functions such as topology discovery in a system configuration management, the mesh action frame 400 can be sent to an appropriate configuration management processor.

At step 628, the process 600 ends.

Thus, to facilitate transport of management traffic in a mesh network, a new type of frame referred to as a "mesh action" frame is provided for transporting management traffic across one or more mesh links. Intermediate nodes forwarding a mesh action frame to its destination node can process the frame in the same manner as a mesh data frame. The destination node can use the "mesh action" frame type to facilitate processing upon receiving the frame. The mesh action frame type distinguishes the message from a data frame, allowing the contents to be processed by the appropriate internal function. The mesh action frame allows mesh nodes to distinguish between user and management traffic to allow for efficient forwarding over a mesh since nodes may forward traffic without examining the contents of the frame being forwarded.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of communication between a transmitter node and a receiver node in a multi-hop communication network, comprising:

formatting information into a data structure to generate a mesh action frame, wherein the mesh action frame comprises:

a header comprising a source address (SA) that identifies a source node, a destination address (DA) that identifies a recipient node, a transmitter address (TA) that identifies a sender node, and a receiver address (RA) that identifies a receiver node; and a body field comprising a mesh action data unit, wherein the mesh action data unit comprises:

a category field configured to specify at least one of a plurality of category values, wherein each category value corresponds to a particular management category;

an action field configured to specify at least one of a plurality of management action values for each category field; and a contents field comprising information corresponding to the action value specified in the action field, wherein the category value and the action value uniquely identify the contents field; and sending the mesh action frame from the transmitter node.

2. A method according to claim 1, further comprising:
receiving the mesh action frame at the receiver node; and
acting on the mesh action frame at the receiver node.

3. The method of claim 1, wherein the category field is used to identify management categories which categorizes management traffic into different classes.

4. The method of claim 1, wherein for each category value at least one different action value is defined for use in the action field.

5. The method of claim 1, wherein the category field allows a recipient node to redirect the mesh action frame to an appropriate processing engine.

6. The method of claim 5, wherein the appropriate processing engine can then parse the contents field based upon the action value specified in the action field.

7. The method of claim 1, wherein the header allows an intermediate node to forward management traffic without examining the mesh action data unit.

8. The method of claim 1, wherein the body field further comprises:

a security field that allows the contents field to be encrypted to provide hop-by-hop security; and a Message Integrity Check (MIC) field calculated over the security field and the mesh action data unit to allow the mesh action data unit to be integrity-protected against modification during transmission.

9. The method of claim 1, wherein the mesh action frame further comprises:
a frame check sequence (FCS) field calculated over the header and the body field for detecting errors in the mesh action frame which occur during transmission.

10. A method for communicating management traffic across one or more mesh links, the method comprising:
formatting a modulated data signal having a data structure encoded thereon, the data structure comprising:
a header comprising a source address (SA) that identifies a source node, a destination address (DA) that identifies a recipient node, a transmitter address (TA) that identifies a sender node, and a receiver address (RA) that identifies a receiver node; and
a body field comprising a mesh action data unit, wherein the mesh action data unit comprises:
a category field configured to specify at least one of a plurality of category values, wherein each category value corresponds to a particular management category;
an action field configured to specify at least one of a plurality of management action values for each category field; and
a contents field comprising information corresponding to the action value specified in the action field, wherein the category value and the action value uniquely identify the contents field; and
communicating the modulated data signal across the one or more mesh links.

11. The method of claim 10, wherein the category field is used to identify management categories which categorizes management traffic into different classes.

12. The method of claim 10, wherein for each category value at least one different action value is defined for use in the action field.

13. The method of claim 10, wherein the category field allows a recipient node to redirect the data structure to an appropriate processing engine.

14. The method of claim 13, wherein the appropriate processing engine can then parse the contents field based upon the action value specified in the action field.

15. The method of claim 10, wherein the header allows an intermediate node to forward management traffic without examining the mesh action data unit of the data structure.

16. The method of claim 10, wherein the body field further comprises:
a security field that allows contents field to be encrypted to provide hop-by-hop security.

17. The method of claim 10, wherein the body field further comprises:
a Message Integrity Check (MIC) field calculated over the security field and the mesh action data unit to allow the mesh action data unit to be integrity-protected against modification during transmission.

18. The method of claim 10, further comprising:
a frame check sequence (FCS) field calculated over the header and the body field for detecting errors in the data structure which occur during transmission.

* * * * *